US010328523B2

United States Patent
Earle et al.

(10) Patent No.: US 10,328,523 B2
(45) Date of Patent: Jun. 25, 2019

(54) FLUTED ADDITIVE MANUFACTURING DEPOSITION HEAD DESIGN

(71) Applicant: Rolls-Royce Corporation, Indianapolis, IN (US)

(72) Inventors: Pavlo Earle, Carmel, IN (US); Brandon David Ribic, Carmel, IN (US); Quinlan Yee Shuck, Indianapolis, IN (US); Johnny D. Grubbs, Clayton, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 717 days.

(21) Appl. No.: 14/794,538

(22) Filed: Jul. 8, 2015

(65) Prior Publication Data
US 2016/0008887 A1    Jan. 14, 2016

Related U.S. Application Data

(60) Provisional application No. 62/023,442, filed on Jul. 11, 2014.

(51) Int. Cl.
| | |
|---|---|
| *B22F 3/105* | (2006.01) |
| *B23K 26/14* | (2014.01) |
| *B28B 1/00* | (2006.01) |
| *B28B 13/02* | (2006.01) |
| *B33Y 30/00* | (2015.01) |

(Continued)

(52) U.S. Cl.
CPC ........ *B23K 26/1476* (2013.01); *B23K 26/144* (2015.10); *B23K 26/34* (2013.01); *B28B 1/001* (2013.01); *B28B 13/022* (2013.01); *B29C 64/153* (2017.08); *B33Y 30/00* (2014.12);

(Continued)

(58) Field of Classification Search
CPC ... B28B 1/001; B28B 13/022; B29C 67/0077; B29C 67/0085; B29C 64/153; B22F 3/1055; B22F 2003/1056; B29K 2105/25; B23K 26/1476; B23K 26/34; B23K 26/144; B23Y 30/00; Y02P 10/295
See application file for complete search history.

(56) References Cited

U.S. PATENT DOCUMENTS

| 3,685,882 A | * | 8/1972 | Van Der Jagt | ..... B23K 26/1476 |
| | | | | 219/121.6 |
| 3,821,510 A | * | 6/1974 | Muncheryan | .......... A61B 18/22 |
| | | | | 219/121.79 |

(Continued)

FOREIGN PATENT DOCUMENTS

| EP | 2329935 A1 | 6/2011 |
| EP | 2502729 A1 | 9/2012 |
| WO | WO-2013137289 A1 * | 9/2013 ......... B23K 26/1476 |

OTHER PUBLICATIONS

Extended Search Report from counterpart European Application No. 15176170.7, dated Nov. 9, 2015, 8 pp.

(Continued)

*Primary Examiner* — Seyed Masoud Malekzadeh
(74) *Attorney, Agent, or Firm* — Shumaker & Sieffert, P.A.

(57) ABSTRACT

A material deposition head may include a body that defines first and second ends, an exterior surface, an interior surface, and one or more material delivery channels, where the exterior surface includes fluting. In some examples, a system may include a fluted material deposition head, a fluidized powder source, and an energy source.

18 Claims, 3 Drawing Sheets

(51) Int. Cl.
*B23K 26/34* (2014.01)
*B23K 26/144* (2014.01)
*B29C 64/153* (2017.01)
*B29K 105/00* (2006.01)

(52) U.S. Cl.
CPC . *B22F 2003/1056* (2013.01); *B29K 2105/251* (2013.01); *Y02P 10/295* (2015.11)

(56) References Cited

U.S. PATENT DOCUMENTS

| | | | | |
|---|---|---|---|---|
| 4,377,735 | A | * | 3/1983 | Minamida ............ B23K 10/00 |
| | | | | 219/121.6 |
| 4,428,691 | A | | 1/1984 | Suzuki et al. |
| 4,724,299 | A | * | 2/1988 | Hammeke ............ B05B 7/1486 |
| | | | | 219/121.6 |
| 4,839,495 | A | * | 6/1989 | Kitera ............... B23K 26/0665 |
| | | | | 219/121.63 |
| 5,122,632 | A | * | 6/1992 | Kinkelin ............... B05B 7/10 |
| | | | | 219/121.63 |
| 5,418,350 | A | | 5/1995 | Freneaux et al. |
| 5,477,026 | A | * | 12/1995 | Buongiorno ......... B23K 26/144 |
| | | | | 219/121.64 |
| 5,818,009 | A | * | 10/1998 | Nakata ............... B23K 26/1476 |
| | | | | 219/121.84 |
| 5,961,862 | A | | 10/1999 | Lewis et al. |
| 6,316,744 | B1 | | 11/2001 | Nowotny et al. |
| 6,534,745 | B1 | | 3/2003 | Lowney |
| 6,797,919 | B1 | * | 9/2004 | Millard ................ B23K 26/123 |
| | | | | 219/121.84 |
| 7,030,337 | B2 | | 4/2006 | Baker et al. |
| 7,259,353 | B2 | | 8/2007 | Guo |
| 7,358,457 | B2 | | 4/2008 | Peng et al. |
| 7,550,693 | B2 | | 6/2009 | Hughes et al. |
| 7,605,346 | B2 | | 10/2009 | Harris et al. |
| 7,626,136 | B2 | * | 12/2009 | Sato ..................... B23K 26/144 |
| | | | | 118/308 |
| 8,119,950 | B2 | | 2/2012 | Stiles et al. |
| 8,129,657 | B2 | | 3/2012 | Nowotny et al. |
| 2005/0103756 | A1 | * | 5/2005 | Baker ................ B23K 26/0096 |
| | | | | 219/121.63 |
| 2005/0133486 | A1 | * | 6/2005 | Baker ................ B23K 26/0096 |
| | | | | 219/121.63 |
| 2012/0037604 | A1 | | 2/2012 | Shikata |
| 2012/0325779 | A1 | | 12/2012 | Yelistratov |
| 2015/0196975 | A1 | * | 7/2015 | Sato ................... B23K 26/1476 |
| | | | | 239/135 |
| 2017/0259377 | A1 | * | 9/2017 | Ohno ..................... B33Y 30/00 |

OTHER PUBLICATIONS

Examination Report from counterpart European Application No. 15176170.7, dated May 23, 2018, 6 pp.

Response to Examination Report dated May 23, 2018, from counterpart European Application No. 15176170.7, filed Sep. 18, 2018, 34 pp.

* cited by examiner

FLUTED ADDITIVE MANUFACTURING DEPOSITION HEAD DESIGN

RELATED APPLICATIONS

This application claims the benefit of U.S. Provisional Application No. 62/023,442, titled, "FLUTED ADDITIVE MANUFACTURING DEPOSITION HEAD DESIGN," filed Jul. 11, 2014, the entire content of which is incorporated herein by reference.

TECHNICAL FIELD

The present disclosure describes a head for use in additive manufacturing.

BACKGROUND

Additive manufacturing generates three-dimensional structures through addition of material layer-by-layer or volume-by-volume to form the structures, rather than removing material from an existing component to generate three-dimensional structures. Additive manufacturing may be advantageous in certain circumstances, such as rapid prototyping, forming components with complex three-dimensional structures, or the like. In some examples, the additive manufacturing process may utilize a laser to melt or sinter together powdered materials in predetermined shapes to form the three-dimensional structures.

SUMMARY

The present disclosure describes a material deposition head used in the additive manufacturing process that includes fluting on one or more of its surfaces, to facilitate convection-driven cooling of and reduced absorption of heat by the head. The material deposition head may be coupled to an energy source, such as a laser. A fluid source, such as an inert gas, may carry a material through one or more internal channels of the material deposition head, which directs the material to be deposited on a substrate, to be heated by an energy source coupled to the material deposition head. For example, a laser may be positioned to deliver a laser beam through an open, inner portion of a laser material deposition head to deliver energy to and heat metal or alloy particles directed by a nozzle of the head on a substrate in a predetermined pattern. A gas that carries the metal or alloy particles through the material delivery channel of the laser material deposition head may deflect from the substrate back toward the head and pass over fluting positioned on one or more exterior surfaces of the head. Fluting may be oriented in particular directions, for example, to increase the surface area of contact between a gas and the fluting, reduce absorption of heat radiating from an energy source associated with the additive manufacturing process, or direct gas flowing over the fluting in a particular direction. Including fluting on one or more surfaces of a material deposition head may allow for higher operating temperatures or power to be used in the additive manufacturing process than otherwise would be possible without a fluted head design.

In some examples, a material deposition head of this disclosure may include a body that defines a first end and a second end, an exterior surface extending from the first end of the body to the second end of the body, and an interior surface that defines an internal passage extending from the first end to the second end. The body of the material deposition head also may define a material delivery channel extending from proximate to the first end of the body to proximate to the second end of the body, where the exterior surface of the body includes fluting.

In addition, in some examples, a material deposition head may be a laser material deposition head, and fluting may be disposed (e.g., by machining) on an exterior and/or interior surface of the body of the laser material deposition head. Such fluting may include a plurality of peaks connected by a plurality of troughs. An exterior surface of the body of a material deposition head of this disclosure also may include, in some examples, a chamfer that tapers inwardly toward the internal passage of the body, where the chamfer also including fluting. Additionally or alternatively, the material delivery channel of the body may include a plurality of material delivery channels, and the body may include multiple portions, for example, a first body portion and a second body portion that are configured to be coupled together.

In some examples, a system of this disclosure may include a material deposition head that has a body defining a first end and a second end, where the body further defines an exterior surface that extends from the first end of the body to the second end of the body, and an interior surface defining an internal passage that extends from the first end to the second end. Such an internal passage may be configured to permit passage of an energy beam therethrough. The material delivery channel defined by the body extends from proximate to the first end of the body to proximate to the second end of the body, wherein the material delivery channel is configured to permit passage of a fluidized powder therethrough, wherein the exterior surface of the body includes fluting. Such an exemplary system also may include a fluidized powder source coupled to the material delivery channel, and an energy source coupled to the internal passage.

The details of one or more examples are set forth in the accompanying drawings and the description below. Other features, objects, and advantages will be apparent from the description and drawings, and from the claims.

DETAILED DESCRIPTION

Figure 1:
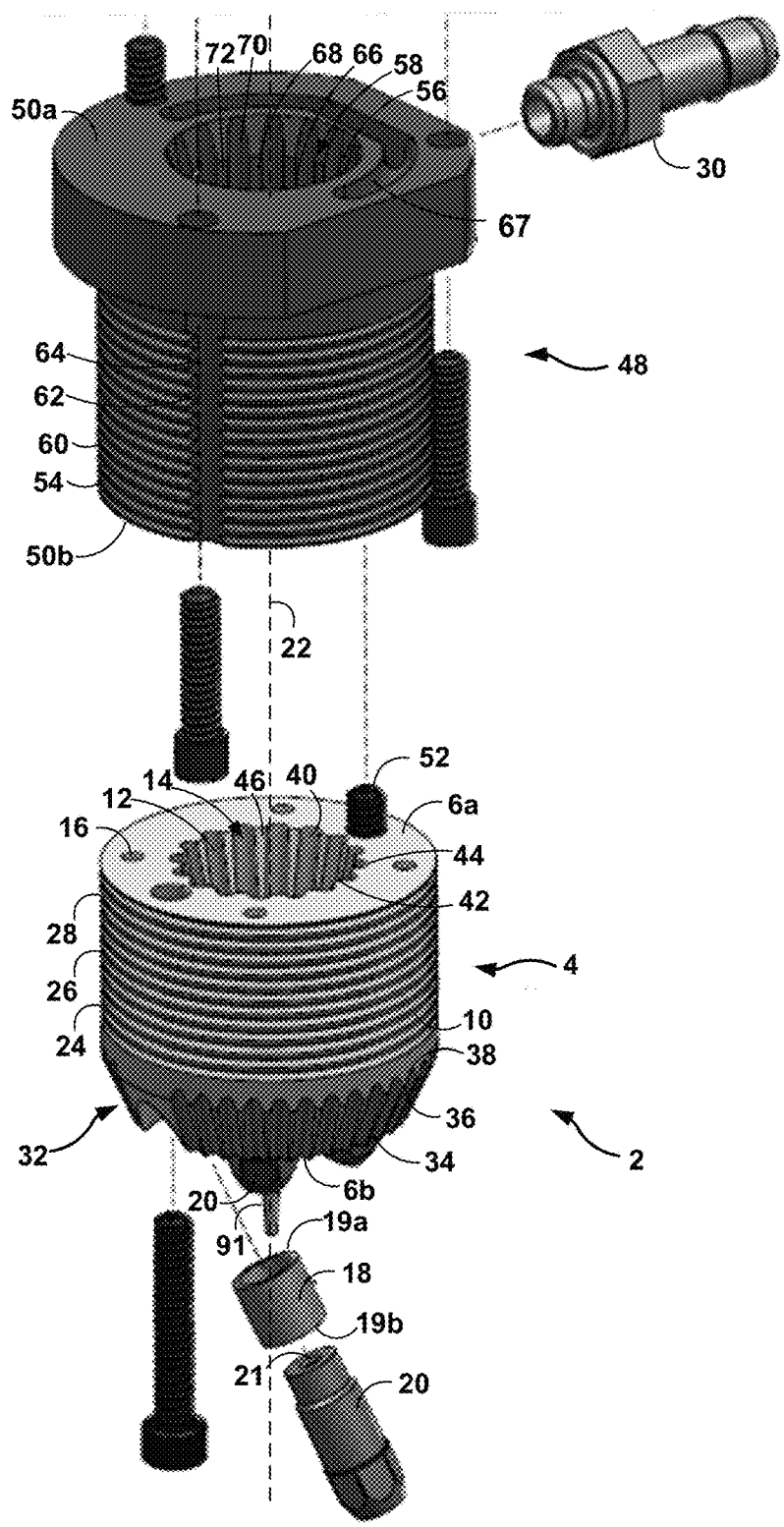
FIG. 1 is an exploded perspective view of an exemplary material deposition head described by this disclosure.

The present disclosure describes material deposition heads used in additive manufacturing (e.g., material addition or three-dimensional fabrication) that have fluting defined on one or more surfaces of the heads to at least one of facilitate cooling of the heads, reduce the absorption of heat, or enhance performance of the heads during the additive manufacturing process. During additive manufacturing, a component is built by adding material to the component in sequential layers. The final component is composed of a plurality of layers of material. In some additive manufacturing techniques for forming components from metals, alloys, polymers, or ceramics, a powder may be delivered to a surface of a previously formed layer using a carrier gas, and an energy source may be directed at predetermined volumes of the powder to heat the powder and join the powder to the previously formed layer. The heating of the powder may, in some examples, cause the powder to sinter or melt to join the powder to the previously formed layer and/or a substrate material. The heat source may be, for example, a laser. The heat source and the sintering or melting may generate heat, at least some of which may be absorbed by the material deposition head. Left unchecked, this heating may affect operation of the material deposition head, e.g., by damaging the material deposition head.

In some examples, the material deposition head may be fluted along one or more exterior surfaces to increase convection-driven cooling of the material deposition head compared to a deposition head with no fluting, other process parameters being equal. Sources of heat that may be absorbed by the material deposition head during the additive manufacturing process may include, for example, heat from an energy beam (e.g., a laser) passing through a focal passage in the interior of the head, or heat radiating from a melt pool of material at which the laser is directed. During the additive manufacturing process, a gas carrying powdered material through a material delivery channel and out a nozzle coupled to the material deposition head may impact the substrate to which the additive manufacturing process is adding material, then deflect back toward the material deposition head. In such an example, the gas may pass over fluting on one or more exterior surfaces of the material deposition head. Fluting a surface of the material deposition head increases the total surface area of the material deposition head and may increase convection-driven cooling compared to a material deposition head without fluting on its exterior surface(s). In some examples, the fluted material deposition heads of this disclosure may exhibit an operating temperature that is about 40° C. lower than material deposition heads not including fluting, when compared under the same deposition parameters.

In some examples, the material deposition head also may be fluted along one or more interior surfaces, such as the focal passage for the energy source. For example, an inner circumference of an interior surface of the material deposition head may define a center focal passage through which an energy source, such as a laser, may be focused (e.g., focused adjacent to the surface to which material is to be added). The interior surface of the material deposition head that defines the center focal passage may be fluted.

Material deposition heads including fluting on an external surface, an internal surface, or both, may facilitate cooling of the material deposition heads without utilizing a liquid cooling medium, such as water. In some examples, water cooling of material deposition heads may be undesirable or impracticable. For example, when the size or volume of a material deposition head is small, when there is limited access to smaller components of a material deposition head, when additive manufacturing is carried out in a sealed or inert environment, and/or when reduction of the risk of water contamination is desired, water cooling of a material deposition head may be problematic. The material deposition heads described herein may reduce the risk of liquid contamination or leakage during an additive manufacturing process, may allow for a reduced footprint of the material deposition head compared to material deposition heads cooled by liquids, or both.

FIG. 1 is an exploded perspective view of an exemplary material deposition head 2 according to this disclosure. In the example illustrated in FIG. 1, material deposition head 2 includes a first body portion 4 and a second body portion 48. In other examples, material deposition head 2 may include a single body portion or more than two body portions. First body portion 4 of material deposition head 2 defines a first end 6a and a second end 6b at opposing ends of first body portion 4, and an exterior surface 10 of body 4 extending from first end 6a to second end 6b. First body portion 4 defines a major axis 22 extending from first end 6a to second end 6b. In some examples, at least a portion of one or both of first end 6a and second end 6b includes a planar surface.

As shown in FIG. 1, first body portion 4 also may define an interior surface 12 that defines an internal passage 14 within first body portion 4. Internal passage 14 may extend from first end 6a to second end 6b of first body portion 4 and be configured to permit passage therethrough of an energy beam generated by an energy source. For example, an energy beam generated by an energy source may pass through internal passage 14 of first body portion 4, exit material deposition head 2 at second end 6b along major axis 22 (for example, in line with line 91 shown in FIG. 1), impact a material disposed on or adjacent to the substrate by a fluidized powder directed adjacent to the substrate, and be absorbed by the material. In some examples, as shown in FIG. 1, first body portion 4 may be substantially cylindrical in shape (for example, cylindrical or nearly cylindrical), such that exterior surface 10 defines an outer circumference of first body portion 4, and interior surface 12 defines an inner circumference of first body portion 4. In some such examples, first body portion 4 may be substantially annular in a radial cross-section (for example, annular or nearly annular), and the circumference of interior surface 12 is less than the circumference of exterior surface 10. The radial cross-section of first body portion 4 may be in a plane substantially orthogonal to major axis 22. First body portion 4 of material deposition head 2 may be composed of any suitable material, for example, a metal, such as aluminum or copper, an alloy, such as an aluminum alloy or a copper alloy, a ceramic, or the like. Such a material or materials may, in some examples, exhibit relatively little wear from a fluidized powder that passes therethrough.

First body portion 4 of material deposition head 2 also may define one or more material delivery channels 16 that extend from first end 6a, or from proximate to first end 6a, to second end 6b, or to proximate to second end 6b of first body portion 4. For example first, body portion 4 may define a plurality of material delivery channels 16, such as four material deliver channels 16.

In some examples, at least a portion of each channel of a plurality of material delivery channels 16 may form a separate channel then converge with other material delivery channels 16 proximate to second end 6b, in the form of a manifold or a single channel. In other examples, some or all of each channel of the plurality of delivery channels 16 may not converge proximate to second end 6b, with each channel being fluidically coupled to a respective nozzle, such as four material delivery channels 16 fluidically coupled to four respective nozzles. Material delivery channels 16 are configured to provide a path for delivery of the material to be deposited by material deposition head 2 in carrying out the additive manufacturing process. For example material deposition heads including multiple material delivery channels 16, the channels may distribute a substantially equal volume (e.g., an equal volume or nearly equal volume) of a material, such as a fluidized powder, from a material source through each of the multiple channels. In some examples, the material may be provided and flow through material delivery channels 16 as a fluidized powder, in which a flowing fluid carries powder of the material through material delivery channels 16. In some examples, the fluid includes a gas, such as, for example, a source of helium, argon, or other substantially inert gas. As used herein, a substantially inert gas may include a gas that does not react with a substrate or the material being added to the substrate during the additive manufacturing process.

Figure 2:
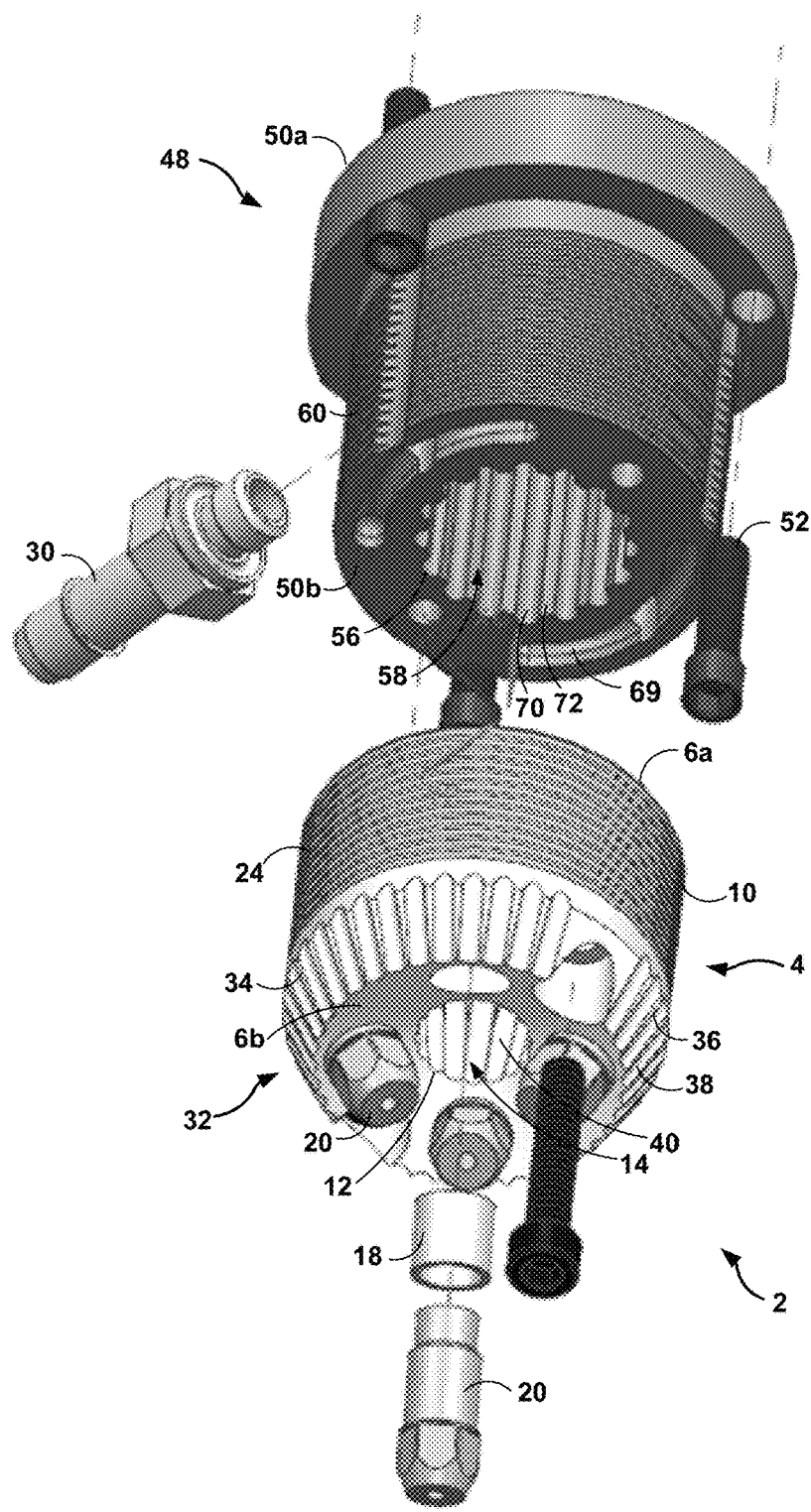
FIG. 2 is an exploded alternative view of the exemplary material deposition head of FIG. 1.

At or proximate to second end 6b of first body portion 4 of material deposition head 2, material delivery channels 16 may be fluidically coupled to a nozzle 20, or each material delivery channel may be fluidically coupled to its own respective nozzle (as shown in FIG. 2). For example, each material delivery channel of the plurality of material delivery channels 16 may be coupled to a respective nozzle 20 using an insert 18, which may be, for example, cylindrical in shape, with an inner circumference defining an opening and an outer circumference defining an exterior surface, as shown in FIG. 1. A first end 19a of insert 18 (e.g., a tube or helical insert) may engage with an aperture defined in second end 6b of first body portion 4 of material deposition head 2, while a second end 19b of insert 18 may be coupled to, engage with, or receive nozzle 20. In other examples, nozzles 20 may be attached directly to first body portion 4 of material deposition head 2, without a respective insert 18.

Nozzle 20 includes a channel 21 that may be fluidly coupled to one or more material delivery channels 16 of first body portion 4. Material carried by a fluid, such as a fluidized powder, may be expelled via channel 21 of nozzle 20 and directed adjacent to a surface of a substrate to be added to the surface of the substrate during the additive manufacturing process.

In some examples, first body portion 4 includes fluting 24 on exterior surface 10. As discussed above, fluting 24 may increase the surface area of exterior surface 10 of body 4, as compared to an exterior surface without fluting, e.g., a smooth exterior surface. Fluting 24 of exterior surface 10 of body 4 may include a plurality of peaks 26 connected by a plurality of troughs 28, as shown in FIG. 1. Each peak of the plurality of peaks 26 may have a width that remains constant or varies as the peak traverses exterior surface 10, and may include a planar surface in some examples. Each trough of the plurality of troughs 28 likewise may have a width that remains constant or varies as the trough traverses exterior surface 10. Each peak and each trough, as described, may have a same width or a different width as compared to adjacent peaks and troughs. Thus, the pitch (distance) between adjacent peaks may be constant or may vary. Moreover, the height of each peak, measured with respect to the depth of an adjacent trough, may be constant or may vary, as compared to adjacent peaks.

Fluting 24 also may include, in some examples, a series of grooves in exterior surface 10. In some examples, at least some (or all) of the troughs of the plurality of troughs 28 of exterior surface 10 of body 4 may form a curve in axial cross-section (e.g., when fluting 24 is oriented in a direction orthogonal to major axis 22), such as a u-shaped curve, with each end of the curve terminating at a point of a peak of the plurality of peaks 26 or at an edge of a planar surface of a peak. In other examples, the plurality of peaks 26 and plurality of troughs 28 may form a continuous curve in axial cross-section (again, when fluting 24 is oriented in a direction orthogonal to major axis 22), such as a sinusoidal curve, as they traverse exterior surface 10. Fluting 24 may be continuous or discontinuous in any direction (e.g., the radial or axial direction).

Additionally or alternatively, fluting 24 may be oriented in a direction substantially orthogonal (e.g., orthogonal or nearly orthogonal) to a major axis 22 of body 4 that extends from first end 6a to second end 6b. Orienting fluting 24 in a direction substantially orthogonal to major axis 22 of body 4 also may place fluting 24 in a direction substantially orthogonal to the direction of flow of fluids (such as a gas) that may impact a substrate at which the material deposition head 2 is directed then deflect back toward the head 2. In other examples, fluting 24 may be oriented in other directions, for example, oriented substantially parallel (e.g., parallel or nearly parallel) to major axis 22, or oriented at some angle between orthogonal and parallel to major axis 22. Fluting 24 (or any other fluting on material deposition head 2, in general) also may allow for increased dissipation of heat (e g , infrared energy) absorbed by body 4 or material deposition head 2 from heat sources associated with additive manufacturing, such as an energy source (e.g., a laser) or a melt pool of material being deposited. Fluting, as described by this disclosure, may be formed on first body 4 or material deposition head 2 by any suitable method, for example, by machining, material ablation, or the like. In some examples, fluting in a particular direction may be applied based, among other reasons, on ease of forming the fluting in a particular direction by use of machining.

In some examples, exterior surface 10 may include a chamfer 32 that, for example, tapers radially inwardly toward internal passage 14 proximate to second end 6b of body 4, as shown in FIG. 1. A surface of chamfer 32 also may include fluting 34. In some examples, fluting 34 may include a plurality of peaks 36 connected by a plurality of troughs 38. In some examples, at least some (or all) of the troughs of the plurality of troughs 38 of chamfer 32 may form a curve in radial cross-section (e.g., when fluting 34 is oriented in a direction that forms an acute angle with major axis 22), such as a u-shaped curve, with each end of the curve terminating at a point of a peak of the plurality of peaks 36 or at an edge of a planar surface of a peak. In other examples, the plurality of peaks 36 and plurality of troughs 38 on chamfer 32 may form a continuous curve in radial cross-section (again, when fluting 34 is oriented in a direction forming an acute angle with major axis 22), such as a sinusoidal curve, as they traverse exterior surface 10. Fluting 34 may be oriented in a direction that forms an acute angle with major axis 22, by virtue of placement of fluting 34 on the radially inwardly tapering chamfer 32, as shown in FIG. 1. In other examples, fluting 34 may be oriented in other directions, for example, at some angle between orthogonal and parallel to major axis 22.

Further, each peak of the plurality of peaks 36 may have a width that remains constant or varies as the peak traverses chamfer 32, and may include a planar surface in some examples. For example, the planar surface of each peak of plurality of peaks 36 of chamfer 32 may narrow in width as the peak approaches second end 6b of body 4. Fluting 34 also may include, in some examples, a series of grooves on chamfer 32. Fluting 34 may be continuous or discontinuous in any direction (e.g., the radial or axial direction). Each trough of the plurality of troughs 38 likewise may have a width that remains constant or varies as the trough traverses the chamfer 32. Each peak and each trough on chamfer 32 may have a same width or a different width as compared to adjacent peaks and troughs. Thus, the pitch (distance) between adjacent peaks may be constant or vary. Moreover, the height of each peak, measured with respect to the depth of an adjacent trough, may be constant or vary, as compared to adjacent peaks.

Placement of fluting 34 on chamfer 32 in an orientation that forms an acute angle with major axis 22 may reduce absorption of heat (e g , infrared energy) from a melt pool of material at which an energy source coupled to the material deposition head is related, increase convection driven cooling of material deposition head 2 due to its increased surface area, and direct gas deflected from the substrate toward fluting 24 to facilitate convection driven cooling of material deposition head 2. To the extent energy from an energy source (e.g., a laser) coupled to material deposition head 2 may radiate or reflect from a substrate back toward material deposition head 2 or chamfer 32, orientation of fluting 34 on chamfer 32 in a direction that forms an acute angle with major axis 22 also may reduce absorption of energy or heat radiated or reflected from this source.

In some examples, interior surface 12 also may include fluting 40. Fluting 40 may include a plurality of peaks 42 connected by a plurality of troughs 44. In some examples, at least some (or all) of the troughs of the plurality of troughs 44 of interior surface 12 of body 4 may form a curve in radial cross-section (e.g., when fluting 40 is oriented in a direction parallel to major axis 22), such as a u-shaped curve, with each end of the curve terminating at a point of a peak of the plurality of peaks 42 or at an edge of a planar surface of a peak. In other examples, the plurality of peaks 42 and plurality of troughs 44 may form a continuous curve in radial cross-section, such as a sinusoidal curve, as they traverse interior surface 12. Fluting 40 may be continuous or discontinuous in any direction (e.g., the radial or axial direction).

In some examples, fluting 40 may be oriented in a direction that is substantially parallel to major axis 22 (for example, parallel or nearly parallel). In other examples, fluting 40 may be oriented in a direction that forms an acute angle with major axis 22, as shown in FIG. 1. In still other examples, fluting 40 may be oriented in a direction substantially orthogonal to major axis 22, or in any angle between orthogonal and parallel to major axis 22. Each peak of the plurality of peaks 42 may have a width that remains constant or varies as the peak traverses interior surface 12, and may include a planar surface 46 in some examples. For example, planar surface 46 of each peak of plurality of peaks 42 may narrow in width as the peak approaches second end 6b of body 4. Each trough of the plurality of troughs 44 likewise may have width that remains constant or varies as the trough traverses interior surface 12. Each peak and each trough, as described, may have a same width or a different width as compared to adjacent peaks and troughs. Thus, the pitch (distance) between adjacent peaks may be constant or vary. Moreover, the height of each peak of the plurality of peaks 42, measured with respect to the depth of an adjacent trough, may be constant or vary, as compared to adjacent peaks. Fluting 40 also may include, in some examples, a series of grooves in interior surface 12.

In some examples, an inner circumference of first body portion 4 defined by interior surface 12 may decrease, and internal passage 14 of first body portion 4 may narrow, when measured in a direction moving from first end 6a toward second end 6b. In other examples, an inner circumference of first body portion 4 defined by interior surface 12 may stay substantially constant (e.g., constant or nearly constant), when measured in a direction moving from first end 6a toward second end 6b.

In some examples, a gas also may be purged through internal passage 14 of first body portion 4, flowing from first end 6a to second end 6b of first body portion 4. The gas may be sourced from, for example, a gas source coupled to material deposition head 2 coupled to material deposition head 2. In examples that include a narrowing inner circumference of first body portion 4, the velocity of the gas flowing through internal passage 14 may increase as the gas flows from first end 6a to second end 6b, increasing cooling or heat transfer along interior fluting and/or exterior fluting when the gas deflects from the substrate back toward material deposition head 2 including exterior fluting. A gas passing through internal passage 14 with an increased velocity also may provide improved protection to optics components (e.g., an energy source, such as a laser) from splatter (e.g., metal splatter from the melt pool of material deposited on a substrate). A narrowing internal passage 14 also may prevent clipping of a converging energy beam (e.g., a laser beam) that passes through internal passage 14. In some examples, a narrowing internal passage 14 may create additional space at second end 6b of first body portion 4 for placement of additional components, such as for one or more nozzles coupled to second end 6b of first body portion 4. Further, placement of fluting 40 on interior surface 12 in an orientation that forms an acute angle with major axis 22 may reduce absorption of heat from a melt pool of material at which an energy source coupled to the material deposition head is related, increase convection driven cooling of material deposition head 2 due to its increased surface area, and direct gas deflected from the substrate toward fluting 24 for additional convection-driven cooling of the head.

As illustrated in FIG. 1, in some examples, material deposition head 2 may include a first body portion 4 configured to be coupled to a second body portion 48. Second body portion 48 may define a first end 50a and a second end 50b at opposing ends of second body portion 48. In some examples, at least a portion of one or both of first end 50a and second end 50b includes a planar surface. Second body portion 48 also defines major axis 22 extending from first end 50a to second end 50b. In such an example, first body portion 4 and second body portion 48 may be coupled by any suitable means, such as by one or more of a plurality of screws 52 that pass through at least part of first body portion 4 and at least part of second body portion 48, as shown in FIG. 1. For example, first end 6a of first body portion 4 may be coupled to second end 50b of second body portion 48 by a plurality of screws 52 disposed in respective threaded holes of a plurality of threaded holes in first body portion 4 and second body portion 48 that are aligned. First body portion 4 or second body portion 48 also may include holes, threaded holes, or any other suitable means that allows either of first body portion 4 or second body portion 48 to be attached to the other portion or to other components associated with the additive manufacturing system. In general, material deposition head 2, or certain portions thereof, may include machined regions that enable components of the head 2 to be mechanically fastened together, or the head 2 to be mechanically fastened to other components used in the additive manufacturing system.

As shown in FIG. 1, second body portion 48 may include an exterior surface 54 that extends from first end 50a to second end 50b. Second body portion 48 also may define an interior surface 56 that defines an internal passage 58 within second body portion 48. Internal passage 58 may extend from first end 50a to second end 50b of second body portion 48. When first body portion 4 and second body portion 48 are assembled, internal passage 58 of second body portion 48 may be substantially aligned (e.g., aligned or nearly aligned) with internal passage 14 of first body portion 4, such that the internal passages together may be configured to allow passage of an energy beam therethrough during the additive manufacturing process. In some examples, as shown in FIG. 1, second body portion 48 may be substantially cylindrical in shape (e.g., cylindrical or nearly cylindrical), such that exterior surface 54 defines an outer circumference of second body portion 48, and interior surface 56 defines an inner circumference of second body portion 48. In some such examples, second body portion 48 may be substantially annular in a radial cross-section (e.g., annular or nearly annular), and the circumference of interior surface 56 is less than the circumference of exterior surface 54. The radial cross-section of second body portion 48 may be in a plane substantially orthogonal to major axis 22. Second body portion 48 of material deposition head 2 may be composed of any suitable material, for example, a metal, such as aluminum or copper, an alloy, such as an aluminum alloy or copper alloy, a ceramic, or the like.

Second body portion 48 of material deposition head 2 also may define one or more material delivery channels (not shown in FIG. 1) that extend from first end 50a, or from proximate to first end 50a, to second end 50b, or to proximate to second end 50b of second body portion 48. For example, second body portion 48 may define a plurality of material delivery channels, such as four channels. In some examples, each material delivery channel of the plurality of material delivery channels of the second body portion 48 may be substantially aligned (e.g., aligned or nearly aligned) with and/or fluidically coupled to a respective material delivery channel of material delivery channels 16 of first body portion 4, such that the channels are configured to provide a path for delivery of the material (e.g., a fluidized powder) to be deposited by material deposition head 2 in carrying out the additive manufacturing process. In other such examples, each material delivery channel of the plurality of delivery channels 16 of first body portion 4 may be fluidically coupled to at least one material delivery channel of second body portion 48. For example, two material delivery channels 16 of first body portion 4 may be fluidically coupled to one material delivery channel of second body portion 48, and two other material delivery channels 16 of first body portion 4 may be fluidically coupled to one other material delivery channel of second body portion 48 of material deposition head 2. As noted, in some example material deposition heads, first body portion 4 may have a different number of material delivery channels 16 than second body portion 48. For example, an introductory channel 67 (as shown in FIG. 1) on the surface of first end 50a may be fluidically coupled to two material delivery channels that extend from first end 50a to second end 50b of second body portion 48. In such an example, each delivery channel of second body portion 48 may be fluidically coupled to a respective transitional channel 69 in the surface of second end 50b (shown in FIG. 2), where each transitional channel 69 is fluidically coupled to one or more material delivery channels 16 of first body portion 4 (e.g., each transitional channel 69 may be fluidically coupled to two material delivery channels 16 of first body portion 4).

At or proximate to first end 50a of second body portion 48 (as shown in FIG. 1), material delivery channels (not shown in FIG. 1) of second body portion 48 may be coupled with tube 30, which fluidically connects the material delivery channels to a fluidized powder source, or in some examples, a fluid source (e.g., a gas source) or a material source (e.g., a powder source). In some examples, as shown in FIG. 1, tube 30 may be fluidically coupled to the material delivery channels of second body portion 48 via introductory channel 67. Although FIG. 1 illustrates a single tube 30 for fluidically coupling material delivery channels of second body portion 48 to a fluidized powder source, in other examples, material deposition head 2 may include a plurality of tubes 30 for fluidically coupling material delivery channels of second body portion 48 to one or more gas, material, or fluidized powder sources. A gas, material, or fluidized powder source also may be fluidically coupled to material deposition head 2 using a tube, pipe, conduit, or the like, that allows fluid communication. As described, the material the fluid carries, to be deposited in a layer on a substrate, may include at least one of a metal, alloy (e.g., an alloy of nickel and titanium), ceramic, or polymer. In some examples, such as when material deposition head 2 includes a single body portion, tube 30 may fluidically couple a fluidized powder source to material delivery channels 16 of first body portion 4.

In some examples, second body portion 48 includes fluting 60 on exterior surface 54. As discussed above, fluting 60 may increase the surface area of exterior surface 54 of second body portion 48, as compared to an exterior surface without fluting, e.g., a smooth exterior surface. Similar to exterior surface 10 first body portion 4, fluting 60 of exterior surface 54 of second body portion 48 may include a plurality of peaks 62 connected by a plurality of troughs 64, as shown in FIG. 1. Each peak of the plurality of peaks 62 may have a width that remains constant or varies as the peak traverses exterior surface 54, and may include one ore more planar surfaces in some examples. Each trough of the plurality of troughs 64 likewise may have a width that remains constant or varies as the peak traverses exterior surface 54. Each peak and each trough, as described, may have a same width or a different width as compared to adjacent peaks and troughs. Thus, the pitch (distance) between adjacent peaks may be constant or vary. Moreover, the height of each peak, measured with respect to the depth of an adjacent trough, may be constant or may vary, as compared to adjacent peaks.

Fluting 60 also may include, in some examples, a series of grooves in exterior surface 54. In some examples, at least some (or all) of the troughs of the plurality of troughs 64 of exterior surface 54 of second body 48 may form a curve in axial cross-section (e.g., when fluting 60 is oriented in a direction orthogonal to major axis 22), such as a u-shaped curve, with each end of the curve terminating at a point of a peak of the plurality of peaks 62 or at an edge of a planar surface of a peak. In other examples, the plurality of peaks 62 and plurality of troughs 64 may form a continuous curve in axial cross-section (again, when fluting 60 is oriented in a direction orthogonal to major axis 22), such as a sinusoidal curve, as they traverse exterior surface 54. Fluting 60 may be continuous or discontinuous in any direction (e.g., the radial or axial direction). For example, fluting 60 may be disposed continuously on the entirety of exterior surface 54, or disposed only on portions of exterior surface 54.

Additionally or alternatively, fluting 60 may be oriented in a direction substantially orthogonal (e.g., orthogonal or nearly orthogonal) to the major axis 22 of second body portion 48 that extends from first end 50a to second end 50b. Orienting fluting 60 in a direction substantially orthogonal to major axis 22 of second body portion 48 also may place fluting 60 in a direction substantially orthogonal to the direction of flow of fluids (such as a gas) that may impact a substrate at which the material deposition head 2 is directed then deflect back toward the head 2. In other examples, fluting 24 may be oriented in other directions, for example, oriented substantially parallel (e.g., parallel or nearly parallel) to major axis 22, or oriented at some angle between orthogonal and parallel to major axis 22. In some examples, fluting 60 on exterior surface 54 of second body portion 48 may be oriented in a different direction than fluting 24 on exterior surface 10 of first body portion 4. In other examples, fluting 60 and fluting 24 are oriented in the same direction with respect to major axis 22. Fluting 60 may allow for increased dissipation of heat (e.g., infrared energy) absorbed by second body portion 4 or material deposition head 2 from heat sources associated with additive manufacturing, such as an energy source (e.g., a laser) or a melt pool of material being deposited.

In some examples, interior surface 56 of second body portion 48 also may include fluting 66. Fluting 66 may include a plurality of peaks 68 connected by a plurality of troughs 70. Each peak of the plurality of peaks 68 may have a width that remains constant or varies as the peak traverses interior surface 56, and may include one ore more planar surfaces 72 in some examples. For example, planar surface 72 of each peak of plurality of peaks 68 may narrow in width as the peak approaches second end 50b of second body portion 48. In some examples, each trough of the plurality of troughs 70 likewise may have a width that remains constant or varies as the trough traverses interior surface 56. In some examples, one or more parts of some peaks of the plurality of peaks 68 may include a curvilinear surface.

Each peak and each trough, as described, may have a same width or a different width as compared to adjacent peaks and troughs. Thus, the pitch (distance) between adjacent peaks may be constant or vary. Moreover, the height of each peak, measured with respect to the depth of an adjacent trough, may be constant or vary, as compared to adjacent peaks.

Fluting 66 also may include, in some examples, a series of grooves in interior surface 56. In some examples, at least some (or all) of the troughs of the plurality of troughs 70 of interior surface 56 may form a curve in radial cross-section (e.g., when fluting 66 is oriented in a direction parallel to major axis 22), such as a u-shaped curve, with each end of the curve terminating at a point of a peak of the plurality of peaks 68 or an edge of a planar surface of a peak. In other examples, the plurality of peaks 68 and plurality of troughs 70 may form a continuous curve in radial cross-section, such as a sinusoidal curve, as they traverse interior surface 56. Fluting 66 may be continuous or discontinuous in any direction (e.g., the radial or axial direction).

In some examples, fluting 66 may be oriented in a direction that is substantially parallel to major axis 22 (for example, parallel or nearly parallel), as shown in FIG. 1. In other examples, fluting 66 may be oriented in a direction that is substantially orthogonal to major axis 22. In still other examples, fluting 66 may be oriented in a direction that forms some angle with major axis 22 between orthogonal and parallel to major axis 22.

In some examples, an inner circumference of second body portion 48 defined by interior surface 56 may decrease, and internal passage 58 of second body portion 48 may narrow, when measured in a direction moving toward second end 50b. For example, placement of fluting 60 on interior surface 56 in a parallel orientation or an orientation that forms an acute angle with major axis 22 may reduce absorption of heat from an energy source (e.g., a laser or energy beam), from a melt pool of material at which an energy source coupled to material deposition head 2 is related, and increase convection driven cooling of material deposition head 2 due to its increased surface area.

FIG. 2 is an exploded alternative view of the example material deposition head 2 shown in FIG. 1. FIG. 2 illustrates, for example, two transitional channels 69, each transitional Chanel 69 being formed in a surface of second end 50b of second body portion 48. Each transitional channel 69 is fluidically coupled to one or more material delivery channels of second body portion 48 (e.g., each transitional channel 69 is fluidically coupled to one material delivery channel of second body portion 48) and to one or more material delivery channels 16 of first body portion 4 (e.g., each transitional channel 69 is fluidically coupled to two material delivery channels 16 of first body portion 4). FIG. 2 also illustrates second end 6b of first body portion 4 including a concave surface to which one or more nozzles 20 (e.g., four nozzles) are coupled. In some examples, second end 6b may include a substantially planar surface (e.g., planar or nearly planar). FIG. 2 also shows that the inner circumference of first body portion 4 defined by interior surface 12 may decrease, and internal passage 14 of first body portion 4 may narrow, when measured in a direction moving from first end 6a toward second end 6b. As shown in FIG. 2, a narrowing internal passage 14 may create additional space at second end 6b for placement of additional components, such as for one or more nozzles 20 coupled to second end 6b of first body portion 4.

Figure 3:
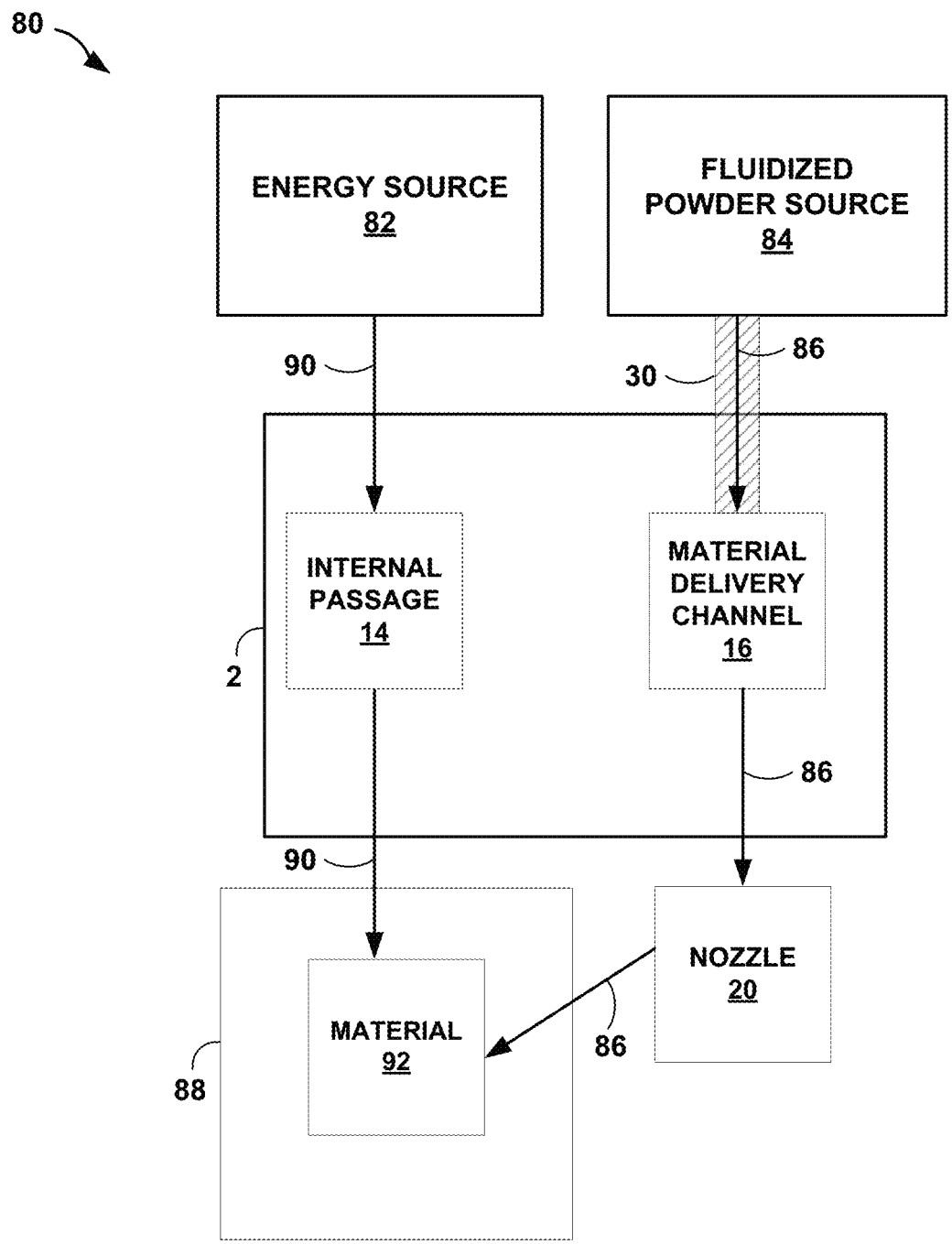
FIG. 3 is a block diagram of an exemplary system including a material deposition head, among other features, as described by this disclosure.

FIG. 3 is a conceptual block diagram of an example system 80 described by this disclosure, which may include a material deposition head 2. Material deposition head 2 of system 80 may include some or all of the various features described herein with respect to material deposition head 2 and FIG. 1. Similar to or the same as described with respect to exemplary material deposition head 2 of FIG. 1, material deposition head 2 of system 80 may include a single body or multiple bodies (e.g., first body portion 4 and second body portion 48), and may include fluting on an external surface and, optionally, an interior surface.

The body of material deposition head 2 also may define one or more material delivery channels 16 that extend from proximate to the first end of the body to proximate to the second end of the body. The one or more material delivery channels 16 of the body of material deposition head 2 may be configured to permit passage of a fluidized powder 86 therethrough. Fluidized powder 86 may be supplied by a fluidized powder source 84 coupled to material delivery channels 16 of the body of material deposition head 2 of system 80. Fluidized powder 86 may include, for example, metal, alloy, ceramic, or polymeric particles carried by a gas. Fluidized powder source 84 may include, for example, a source of helium, argon, or other substantially inert gas fluidically coupled with a source of powder, such as metal, alloy, ceramic, or polymeric particles. Fluidized powder source 84 may be subject to, for example, pressure or vacuum, to enable delivery of fluidized powder 86 from fluidized powder source 84 through a tube (such as tube 30), material delivery channels 16, and a channel of a nozzle (e.g., channel 21 of nozzle 20, as described with reference to FIG. 1).

System 80 also may include an energy source 82 coupled to (e.g., mechanically coupled to, or positioned in alignment with) an internal passage 14 defined by the body of material deposition head 2. Energy source 82 may generate an energy beam 90 that passes through internal passage 14 and heats a material 92 disposed on a substrate 88 by the fluidized powder 86 directed at substrate 88 via nozzle 20, as shown in FIG. 3. Material 92 may include, for example, metal, alloy, ceramic, or polymeric particles, e.g., metal, alloy, ceramic, or polymeric particles from fluidized powder 86. In some examples, energy source 82 may include a laser, plasma source, plasma arc, electrical arc, ultraviolet energy source, infrared energy source, induction coil, or another source of energy may be coupled to (e.g., mechanically coupled to) a material deposition head. Example laser sources include a CO laser, a $CO_2$ laser, a Nd:YAG laser, or the like. For example, system 80 may include a laser positioned to direct a laser beam generated by the laser through the internal passage defined by the body of a laser material deposition head, such that the laser beam heats metal, alloy, ceramic, or polymeric particles directed at a substrate as part of the additive manufacturing process. In some examples, energy source 82 may be selected to provide energy beam 90 with a predetermined wavelength or wavelength spectrum that may be absorbed by material 92 to be added to substrate 88 during the additive manufacturing process. A laser may operate during the additive manufacturing process to heat, sinter, or melt the material being added to the substrate (or being joined to the substrate) at temperatures in the range of 1000° C. to 4000° C. with respect to materials such as polymers, including copolymers, thermoplastics, and thermosets; ceramics, including carbides, nitrides, and oxides; metals, alloys (e.g., nickel-base alloys and titanium-based alloys), ferrous metallic alloys, or non-ferrous metallic alloys. In additive manufacturing processes that utilize lasers operating in the referenced temperature range but do not include material deposition heads including the fluting described by this disclosure, such deposition heads may warm to at least 300° C. during the additive manufacturing process, which may cause distortion to components of the head (e.g., metal components, such as aluminum alloy components).

Nozzle 20 coupled to material deposition head 2, as described with respect to FIGS. 1 and 2, or material deposition head 2 itself, may be positioned at any number of angles with respect to substrate 88. In some examples, nozzle 20 and/or material deposition head 2 may be movable in at least one dimension (e.g., translatable and/or rotatable) to direct fluidized powder 86, and/or energy beam 90 from energy source 82 toward a selected location adjacent to a substrate. For example, the direction of the path of fluidized powder 86 expelled through nozzle 20 may form an acute angle or right angle with substrate 20. Additionally or alternatively, substrate 88 may be movable in at least one dimension relative to material deposition head 2 so that material deposition head 2, and/or components thereof, interact with a selected location adjacent to substrate 88.

In some examples, the material deposition head described herein is an ultra small diameter material deposition head, for example, a cylindrically shaped material deposition head that has a diameter of less than half an inch. The material deposition head may be used in material deposition techniques for additive manufacturing of relatively small components or adding material to locations of components with relatively small clearances. Because of the small size of the material deposition head, using water cooling may not be practical, as the water cooling components may make the material deposition head too large to fit in the desired spaces. Thus, the fluting provided on surfaces of the material deposition head described herein may provide increased cooling of the material deposition head compared to a material deposition head without fluting, while reducing or minimizing an increase in size of the material deposition head.

Clause 1: A material deposition head comprising: a body defining a first end and a second end, wherein the body further defines: an exterior surface extending from the first end of the body to the second end of the body; an interior surface defining an internal passage extending from the first end to the second end; and a material delivery channel extending from proximate to the first end of the body to proximate to the second end of the body, wherein the exterior surface of the body includes fluting.

Clause 2: The material deposition head of clause 1, wherein the material deposition head comprises a material deposition head coupled to an energy source.

Clause 3: The material deposition head of clause 1 or 2, wherein the fluting of the exterior surface of the body comprises a plurality of peaks connected by a plurality of troughs, wherein the plurality of peaks are oriented in a direction substantially orthogonal to a major axis of the body that extends from the first end to the second end.

Clause 4: The material deposition head of any one of clauses 1-3, wherein the interior surface of the body comprises fluting comprising a plurality of peaks connected by a plurality of troughs, and wherein at least a portion of the fluting of the interior surface is oriented in a direction that forms an acute angle with a major axis of the body that extends from the first end to the second end.

Clause 5: The material deposition head of any one of clauses 1-4, wherein the exterior surface of the body includes a chamfer that tapers radially inwardly toward the internal passage proximate to the second end of the body, wherein a surface of the chamfer comprises fluting comprising a plurality of peaks connected by a plurality of troughs, and wherein the fluting of the chamfer is oriented in a direction that forms an acute angle with a major axis of the body that extends from the first end to the second end.

Clause 6: The material deposition head of any one of clauses 1-5, wherein the material delivery channel comprises a plurality of material delivery channels.

Clause 7: The material deposition head of any one of clauses 1-6, wherein the body is substantially cylindrical and substantially annular in a radial cross-section, the circumference of the interior surface being less than the circumference of the exterior surface.

Clause 8: The material deposition head of any one of clauses 1-7, wherein the body comprises a first body portion, and the material deposition head further comprises a second body portion defining a first end and a second end, the second end of the second body portion being configured to be coupled to the first end of the first body portion, wherein the second body portion further defines: an exterior surface extending from the first end of the second body portion to the second end of the second body portion; a interior surface defining an internal passage extending from the first end to the second end, wherein the internal passage of the second body portion is substantially aligned with the internal passage of the first body portion; and a material delivery channel extending from proximate to the first end of the second body portion to proximate to the second end of the second body portion, wherein the material delivery channel of the second body portion is fluidically coupled to the material delivery channel of the first body portion, and wherein the exterior surface of the second body portion includes fluting.

Clause 9: The material deposition head of clause 8, wherein the fluting of the exterior surface of the second body portion comprises a plurality of peaks connected by a plurality of troughs, wherein the plurality of peaks are oriented in a direction substantially orthogonal to a major axis of the second body portion that extends from the first end to the second end of the second body portion.

Clause 10: The material deposition head of clause 8 or 9, wherein the interior surface of the second body portion comprises fluting comprising a plurality of peaks connected by a plurality of troughs, and wherein at least a portion of the fluting of the interior surface of the second body is oriented in a direction substantially parallel to a major axis of the second body portion that extends from the first end to the second end of the second body portion.

Clause 11: The material deposition head of any one of clauses 8-10, wherein the material delivery channel of the first body portion comprises a plurality of material delivery channels, and the material delivery channel of the second body portion comprises a plurality of material delivery channels, wherein each respective material delivery channel of the plurality of material delivery channels of the first body portion is fluidically coupled to at least one material delivery channel of the plurality of material delivery channels of the second body portion.

Clause 12: The material deposition head of any one of clauses 8-11, wherein the second body portion is substantially cylindrical and substantially annular in a radial cross-section, the circumference of the interior surface being less than the circumference of the exterior surface of the second body portion.

Clause 13: A system comprising: a material deposition head comprising a body defining a first end and a second end, wherein the body further defines: an exterior surface extending from the first end of the body to the second end of the body; an interior surface defining an internal passage extending from the first end to the second end, wherein the internal passage is configured to permit passage of an energy beam therethrough; and a material delivery channel extending from proximate to the first end of the body to proximate to the second end of the body, wherein the material delivery channel is configured to permit passage of a fluidized powder therethrough, and wherein the exterior surface of the body includes fluting; a fluidized powder source coupled to the material delivery channel; and an energy source coupled to the internal passage.

Clause 14: The system of clause 13, wherein the material deposition head comprises a laser material deposition head, the fluidized powder comprises at least one of metal, alloy, ceramic, or polymeric particles carried by a fluid, the energy source comprises a laser, and the energy beam comprises a laser beam generated by the laser.

Clause 15: The system of clause 13 or 14, wherein the fluting of the exterior surface of the body comprises a plurality of peaks connected by a plurality of troughs, wherein the plurality of peaks are oriented in a direction substantially orthogonal to a major axis of the body that extends from the first end to the second end.

Clause 16: The system of any one of clauses 13-15, wherein the interior surface of the body comprises fluting comprising a plurality of peaks connected by a plurality of troughs, wherein at least a portion of the fluting of the interior surface is oriented in a direction that forms an acute angle with a major axis of the body that extends from the first end to the second end.

Clause 17: The system of any one of clauses 13-16, wherein the exterior surface of the body includes a chamfer that tapers radially inwardly toward the internal passage proximate to the second end of the body.

Clause 18: The system of clause 17, wherein a surface of the chamfer comprises fluting comprising a plurality of peaks connected by a plurality of troughs, wherein the fluting of the chamfer is oriented in a direction that forms an acute angle with a major axis of the body that extends from the first end to the second end.

Clause 19: The system of any one of clauses 13-18, wherein the body comprises a first body portion, and the material deposition head further comprises a second body portion defining a first end and a second end, the second end of the second body portion being configured to be coupled to the first end of the first body portion, wherein the second body portion further defines: an exterior surface extending from the first end of the second body portion to the second end of the second body portion; an interior surface defining an internal passage extending from the first end to the second end, wherein the internal passage of the second body portion is substantially aligned with the internal passage of the first body portion; and a material delivery channel extending from proximate to the first end of the second body portion to proximate to the second end of the second body portion, wherein the material delivery channel of the second body portion is fluidically coupled to the material delivery channel of the first body portion, wherein the exterior surface of the second body portion includes fluting.

Clause 20: The system of clause 19, further comprising: a tube configured to be coupled to the material delivery channel defined by the second body portion proximate to the first end of the second body portion, wherein the tube is configured to transport fluidized powder from the fluidized powder source; a nozzle configured to be coupled to the second end of the first body portion, wherein the nozzle is fluidically coupled to the material delivery channel of the first body portion and configured to deliver the fluidized powder adjacent to a substrate.

Various examples have been described. These and other examples are within the scope of the following claims.

The invention claimed is:

1. A material deposition head comprising:
a body defining a first end and a second end, wherein the body further defines:
an exterior surface, at least a portion of the exterior surface of the material deposition head extending from the first end of the body to the second end of the body;
an interior surface defining an internal passage extending from the first end to the second end; and
a material delivery channel extending from proximate to the first end of the body to proximate to the second end of the body, wherein the material delivery channel is configured to permit passage of a fluidized powder therethrough, wherein the at least portion of the exterior surface includes fluting configured to increase a surface area of the exterior surface of the body and increase convection-driven cooling of the material deposition head, wherein the fluting of the exterior surface comprises a plurality of peaks connected by a plurality of troughs, wherein the plurality of peaks are oriented in a direction substantially orthogonal to a major axis of the body that extends from the first end to the second end, and wherein at least some troughs of the plurality of troughs of the at least a portion of the exterior surface of the body form a curve in axial cross-section with each end of the curve terminating at a point of a peak of the plurality of peaks or at an edge of a planar surface of the peak.

2. The material deposition head of claim 1, wherein the material deposition head is configured to be coupled to an energy source.

3. The material deposition head of claim 1, wherein the interior surface of the body comprises fluting comprising a plurality of peaks connected by a plurality of troughs, and wherein at least a portion of the fluting of the interior surface is oriented in a direction that forms an acute angle with a major axis of the body that extends from the first end to the second end.

4. The material deposition head of claim 1, wherein the exterior surface includes a chamfer that tapers radially inwardly toward the internal passage proximate to the second end of the body, wherein a surface of the chamfer comprises fluting comprising a plurality of peaks connected by a plurality of troughs, and wherein the fluting of the chamfer is oriented in a direction that forms an acute angle with a major axis of the body that extends from the first end to the second end.

5. The material deposition head of claim 1, wherein the material delivery channel comprises a plurality of material delivery channels.

6. The material deposition head of claim 1, wherein the body is substantially cylindrical and substantially annular in a radial cross-section, a circumference of the interior surface being less than a circumference of the exterior surface.

7. The material deposition head of claim 1, wherein the body comprises a first body portion, and the material deposition head further comprises a second body portion defining a first end and a second end, the second end of the second body portion being configured to be coupled to the first end of the first body portion, wherein the portion of the exterior surface comprises a first portion, and wherein the second body portion further defines:
   at least a second portion of an exterior surface of the material deposition head extending from the first end of the second body portion to the second end of the second body portion;
   an interior surface of the second body portion defining an internal passage extending from the first end to the second end, wherein the internal passage of the second body portion is substantially aligned with the internal passage of the first body portion; and
   a material delivery channel for the second body portion extending from proximate to the first end of the second body portion to proximate to the second end of the second body portion, wherein the material delivery channel of the second body portion is fluidically coupled to the material delivery channel of the first body portion, and wherein the second portion of the exterior surface includes fluting.

8. The material deposition head of claim 7, wherein the fluting of the exterior surface of the second portion comprises a plurality of peaks connected by a plurality of troughs, wherein the plurality of peaks are oriented in a direction substantially orthogonal to a major axis of the second body portion that extends from the first end to the second end of the second body portion.

9. The material deposition head of claim 7, wherein the interior surface of the second body portion comprises fluting comprising a plurality of peaks connected by a plurality of troughs, and wherein at least a portion of the fluting of the interior surface of the second body is oriented in a direction substantially parallel to a major axis of the second body portion that extends from the first end to the second end of the second body portion.

10. The material deposition head of claim 7, wherein the material delivery channel of the first body portion comprises a plurality of material delivery channels, and the material delivery channel of the second body portion comprises a plurality of material delivery channels, wherein each respective material delivery channel of the plurality of material delivery channels of the first body portion is fluidically coupled to at least one material delivery channel of the plurality of material delivery channels of the second body portion.

11. The material deposition head of claim 7, wherein the second body portion is substantially cylindrical and substantially annular in a radial cross-section, a circumference of the interior surface being less than a circumference of the exterior surface of the second body portion.

12. A system comprising:
a material deposition head comprising a body defining a first end and a second end, wherein the body further defines:
   an exterior surface, at least a portion of an exterior surface of the material deposition head extending from the first end of the body to the second end of the body;
   an interior surface defining an internal passage extending from the first end to the second end, wherein the internal passage is configured to permit passage of an energy beam therethrough;
   a material delivery channel extending from proximate to the first end of the body to proximate to the second end of the body, wherein the material delivery channel is configured to permit passage of a fluidized powder therethrough, wherein the at least a portion of the exterior surface includes fluting configured to increase a surface area of the exterior surface of the body and increase convection-driven cooling of the material deposition head, wherein the fluting of the exterior surface comprises a plurality of peaks connected by a plurality of troughs, wherein the plurality of peaks are oriented in a direction substantially orthogonal to a major axis of the body that extends from the first end to the second end, and wherein at least some troughs of the plurality of troughs of the at least a portion of the exterior surface of the body form a curve in axial cross-section with each end of the curve terminating at a point of a peak of the plurality of peaks or at an edge of a planar surface of the peak;
a fluidized powder source coupled to the material delivery channel; and
an energy source coupled to the internal passage.

13. The system of claim 12, wherein the material deposition head comprises a laser material deposition head, the fluidized powder comprises at least one of metal, alloy, ceramic, or polymeric particles carried by a fluid, the energy source comprises a laser, and the energy beam comprises a laser beam generated by the laser.

14. The system of claim 12, wherein the interior surface of the body comprises fluting comprising a plurality of peaks connected by a plurality of troughs, wherein at least a portion of the fluting of the interior surface is oriented in a direction that forms an acute angle with a major axis of the body that extends from the first end to the second end.

15. The system of claim 12, wherein the exterior surface includes a chamfer that tapers radially inwardly toward the internal passage proximate to the second end of the body.

16. The system of claim 15, wherein a surface of the chamfer comprises fluting comprising a plurality of peaks connected by a plurality of troughs, wherein the fluting of the chamfer is oriented in a direction that forms an acute angle with a major axis of the body that extends from the first end to the second end.

17. The system of claim 12, wherein the body comprises a first body portion, and the material deposition head further comprises a second body portion defining a first end and a second end, the second end of the second body portion being configured to be coupled to the first end of the first body portion, wherein the portion of the exterior surface comprises a first portion, and wherein the second body portion further defines:
   at least a second portion of an exterior surface of the material deposition head extending from the first end of the second body portion to the second end of the second body portion;

an interior surface of the second body portion defining an internal passage extending from the first end to the second end, wherein the internal passage of the second body portion is substantially aligned with the internal passage of the first body portion; and
a material delivery channel for the second body portion extending from proximate to the first end of the second body portion to proximate to the second end of the second body portion, wherein the material delivery channel of the second body portion is fluidically coupled to the material delivery channel of the first body portion,
wherein the second portion of the exterior surface includes fluting.

18. The system of claim 17, further comprising:
a tube configured to be coupled to the material delivery channel defined by the second body portion proximate to the first end of the second body portion, wherein the tube is configured to transport fluidized powder from the fluidized powder source;
a nozzle configured to be coupled to the second end of the first body portion, wherein the nozzle is fluidically coupled to the material delivery channel of the first body portion and configured to deliver the fluidized powder adjacent to a substrate.

\* \* \* \* \*